2,800,632

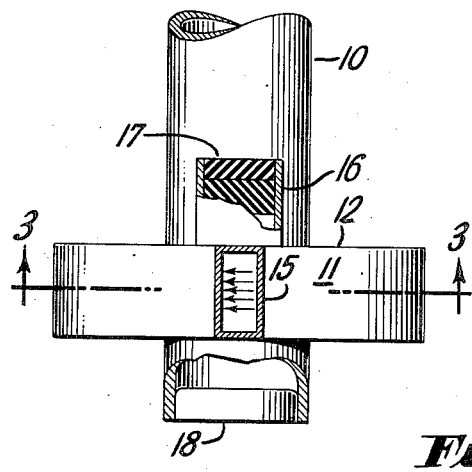
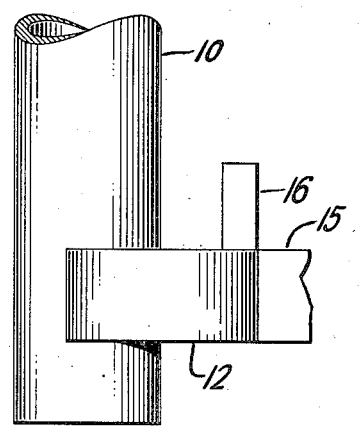
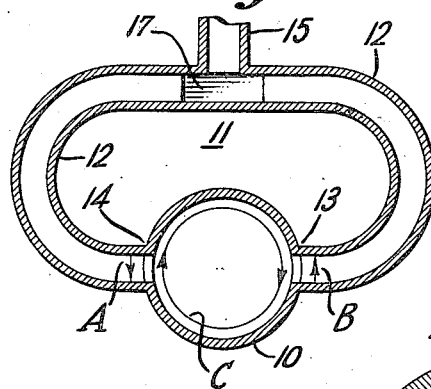
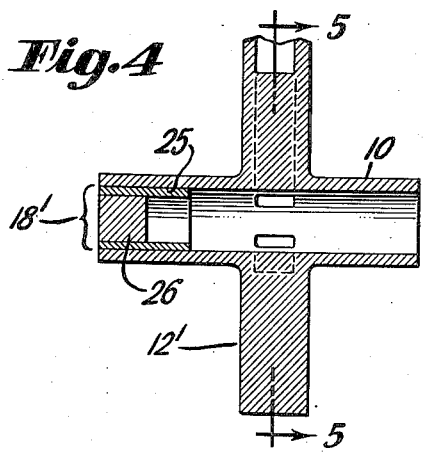
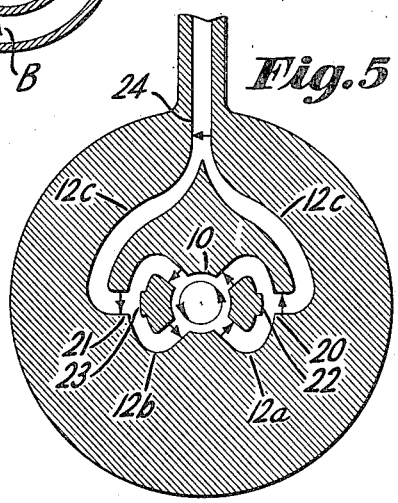
INVENTOR
RICHARD M. WALKER
BY John P. Harvey
ATTORNEY United States Patent Office 2,800,632
Patented July 23, 1957

WAVE GUIDE MODE TRANSFORMER

Richard M. Walker, Dorchester, Mass., assignor to Sylvania Electric Products, Inc., a corporation of Massachusetts Application September 6, 1950, Serial No. 183,351

5 Claims. (Cl. 333—21)

The present invention relates to electromagnetic wave guide transitions and, particularly, to a transition of the type particularly suited for intercoupling a circular wave guide operated in the $TE_{01}$ mode and a rectangular wave guide operated in the $TE_{10}$ mode.

In ultra-high-frequency radio applications, it frequently is desirable to employ rectangular wave guides in preference to circular wave guides in certain instances. For example, it is convenient to couple rectangular wave guides to present day magnetrons, mixers, and the like. On the other hand, circular wave guides operating in the $TE_{01}$ mode are more efficient than the rectangular wave guide in respect to wave-signal energy loss for a given length of wave guide. While rectangular wave guides have been coupled to circular wave guides through a transition, the $TE_{01}$ mode of operation in the circular wave guide may ordinarily be difficult to handle for the reason that the transition may excite four other undesirable modes which have appreciable amplitude and are capable of propagation in a circular wave guide just large enough to support the $TE_{01}$ mode. These other modes are the $TE_{11}$, $TM_{01}$, $TE_{21}$, and $TM_{11}$.

It is an object of the present invention to provide a new and improved wave guide transition for intercoupling circular and rectangular wave guides for operation of the former in the $TE_{01}$ mode and the latter in the $TE_{10}$ mode while minimizing coupling of the wave guides by undesired modes.

It is a further object of the invention to provide a novel wave guide transition of the type mentioned which is effective to suppress at least in part any wave-signal energy which tends to be propagated in the circular wave guide by a mode other than the $TE_{01}$ mode.

It is an additional object of the invention to provide a new and improved wave guide transition which is of the broad-band type in that its electrical characteristics are maintained substantially uniform over a broad band of wave-signal frequencies, and one which is of simple, compact, and inexpensive construction.

For a better understanding of the present invention, together with other and further objects thereof, reference is had to the following description taken in connection with the accompanying drawing and its scope will be pointed out in the appended claims.

Referring now to the drawing, Figs. 1 and 2 are front and side elevational views, partly in cross-section, illustrating a wave guide transition embodying the present invention; Fig. 3 is a cross-sectional view taken along the plane 3—3 of Fig 1; Fig. 4 is a longitudinal cross-sectional view of a wave guide transition embodying a modified form of the invention; and Fig. 5 is a transverse cross-sectional view taken along the plane 5—5 of Fig. 4.

Referring now more particularly to Figs. 1, 2, and 3 of the drawing, the wave guide transition there shown includes a first conductive wave guide portion 10 which is of hollow cylindrical configuration and provides a circular wave guide. The transition also includes a second conductive wave guide portion 11 providing a rectangular wave guide section 12 opening endwise at each of its ends 13 and 14 into the circular wave guide 10 at diametrically spaced points around the circumference of the latter, the wave guide section 12 having its longer transverse cross-sectional dimension extending longitudinally of the circular wave guide. The wave guide portion 11 also includes an additional rectangular wave guide section 15 which is joined to the wave guide section 12 at a point on the latter spaced equi-distant electrically from its ends 13 and 14. The transition further includes means coupled to the wave guide section 12 in symmetrical proximity to the junction of the sections 12 and 15 for absorbing wave-signal energy having any mode of propagation other than the $TE_{10}$ mode desired for the wave guide sections 12 and 15. This means comprises a rectangular wave guide section 16 having cross-sectional dimensions corresponding approximately to those of the wave guide sections 12 and 15 and positioned with its longer cross-sectional dimension extending longitudinally of the wave propagation path of the wave guide section 12 but symmetrical with relation to the axis of the wave guide section 15. The wave guide section 16 is closed at its remote end with any numerous well known forms of material 17 which exhibit the property of absorbing wave-signal energy. The circular wave guide 10 is terminated at its end adjacent the wave guide section 12 by a conductive cylindrical plug 18 preferably adjustable longitudinally of the circular wave guide.

In operation, wave-signal energy in the $TE_{10}$ mode propagated along the wave guide section 15 in the direction of the wave guide section 12 splits at the junction into two components of energy which flow from the junction in opposite directions through the wave guide section 12 toward its ends 13 and 14. These components of energy are of equal amplitude but opposite phase, as indicated by the electric-field arrows A and B. The energies thus flowing in the two halves of the wave guide section 12 have the proper amplitudes and aiding phases at the end points 13 and 14 to excite the circular wave guide 10 in the $TE_{01}$ mode which has circular electric-field lines as indicated by the solid-line arrows C. Due to symmetry of the points at which the rectangular wave guide section 12 is coupled to the circular wave guide section 10, any tendency to excite the circular wave guide in any of the $TM_{01}$, $TM_{02}$, $TM_{11}$, and $TE_{11}$ modes is minimized. Any excitation in these unwanted modes due to junction effects and mechanical asymmetry may be suppressed by a mode filter which may, for example, take the form of radial wires (not shown) located near the coupling region in the circular wave guide and which reflects energy propagating in the unwanted modes and not in the $TE_{01}$ mode. Reflected energy in the unwanted modes excites the two arms of the rectangular wave guide section 12 in phase and thus enters the wave guide section 16 where it is absorbed by the energy absorbing material 17 thereof. This absorbing means is however effective despite omission of the mode filter earlier mentioned. In general, and assuming no junction effects and no mechanical asymmetry at the junction of the rectangular wave guide section 12 and circular wave guide 10, only the undesired $TE_{21}$ mode will be excited in the circular wave guide 10 and will need to be suppressed. Wave-signal energy likewise may be coupled from the circular wave guide portion 10 to the rectangular wave guide portion 15, the operation being the reverse of that described.

Any number of coupling points between the circular wave guide and the rectangular wave guide sections may be used as long as the phases of the exciting components are adjusted in such a way that the individual field components of the rectangular wave guide sections add to give the circular symmetry required for the TE$_{01}$ mode of operation of the circular wave guide. If there are $n$ feed points, in general the most troublesome undesired mode which may be excited in the circular wave guide is the TE$_{n1}$ mode, although as the number of feeding points increase the magnitude of the undesired mode excitation decreases so that the percentage of mode impurity may become so small that reasonably good mode purity is readily obtained. Further, it is well known that the TE$_{41}$ or TE$_{31}$ modes, for example, are only propagated with a very high order of attenuation in a circular wave guide having an internal diameter just large enough to propagate the TE$_{01}$ mode without appreciable attenuation (i. e. just above cut-off for the TE$_{01}$ mode). Hence, there is the important advantage with multiple feed points that the size of the circular wave guide may be readily selected to suppress the undesired TE$_{n1}$ mode. In general, there will also tend to be excited with the TE$_{n1}$ mode also TE$_{x1}$ modes, where $x$ is an even submultiple of $n$, but certain of the latter modes may be suppressed by choice of size of the circular wave guide as last described and all such undesired modes my be minimized by electrical and mechanical symmetry in the construction of the transition.

Figs. 4 and 5 illustrate a construction of the type last described wherein there are four feed points between the circular wave guide and the rectangular wave guide system. In this modification of the invention, elements which are similar to corresponding elements of Figs. 1, 2 and 3 are designated by like reference numerals and analogous elements by like reference numerals primed. The wave guide portion 12' may be formed by a suitable casting process, integral with the wave guide portion 10 if desired, or may be formed of two suitably grooved metallic plates, joined with the grooves in registry. As will be seen more particularly from Fig. 5, the transition includes a pair of rectangular wave guide section 12$a$ and 12$b$ each of which opens endwise at its ends into the circular wave guide as in the Fig. 1 arrangement. Another rectangular wave guide section 12$c$, 12$c$ is jointed at its ends 20, 21 to individual ones of the wave guide sections 12$a$ and 12$b$ at a point on each of the latter which is spaced equi-distant electrically from its ends. A conductive plate 22 may be positioned in conventional manner in opposing relation to the end 20 of one portion of wave guide section 12$c$ for impedance matching purposes, and a similar plate 23 may likewise be positioned in opposing relation to the end 21 of the other portion of wave guide section 12$c$ for the same purpose. The transition includes a further rectangular wave guide section 24 which is joined by a Y junction to the wave guide portions 12$c$, 12$c$ at a point thereon spaced equidistant electrically from the ends 20, 21, the junction of the wave guide sections 12$c$ and 24 being of curvilinear configuration for impedance matching in a manner well known. In this modification, it will be noted that the coupling points between the wave guide sections 12$a$, 12$b$ and the circular wave guide are equally spaced around the circumference of the latter to insure equality and circular symmetry of mode excitation in the circular wave guide.

There is also shown in Fig. 4 a modified form of terminating member 18' for the circular wave guide 10. The member 18' includes a conductive cylinder 25 which is adjustable longitudinally with relation to the coupling region between the circular and rectangular wave guides, and a conductive plug 26 also adjustable longitudinally of the circular wave guide. The inner diameter of the cylinder 25 is selected such that the cylinder propagates the undesired mode component but operates below cut-off for the TE$_{01}$ mode desired for operation of the circular wave guide 10. The position of the cylinder 25 longitudinally of the circular wave guide 10 is adjusted with relation to the coupling region for impedance matching in conventional manner, and the position of the plug 26 is then similarly adjusted for maximum undesired mode suppression, as for example, for suppressing the TE$_{21}$ mode.

It will be apparent that the most troublesome undesired mode which may be excited in the transition last described is the TE$_{41}$ mode since there are four feed points. This mode, however, may be readily suppressed by choice of the internal diameter of the circular wave guide 10 which may be so selected that the circular wave guide operates below cut-off for the TE$_{41}$ mode. Any energy excitation in the TE$_{21}$ mode may be minimized by electrical and mechanical symmetry of the construction of the transition as earlier explained, and may be suppressed if desired by a conventional mode suppressor.

The operation of the Figs. 4 and 5 modification of the invention is essentially similar to that described in connection with Fig. 1, the arrows indicating the electric-field at various points in the transition as in Fig. 3, and will not be repeated.

It has been found that the rectangular wave guide sections in both the Fig. 1 and 4 arrangements preferably should have a depth longitudinally of the circular wave guide 10 equal approximately to one-half wave length in the circular TE$_{01}$ mode. This matches the transverse variation in electric-field in the rectangular wave guide feeds with the longitudinal variation in the circular wave guide.

Impedance matching in this type of transition is accomplished when the following relation is fulfilled:

$$2nb \cong \pi D$$

where $n=$ the number of feed points between the rectangular and circular wave guides
$b$ is the width of each rectangular wave guide parallel to the electric-field; that is, in a plane perpendicular to the axis of the cylindrical wave guide, and
$D=$ the diameter of the circular wave guide From what has been said above with regard the undesired excitation of the TE$_{n1}$ and TE$_{x1}$ modes by multiple feed points, it will be apparent that an odd number of feed points is advantageous. An arrangement of the latter type is disclosed and claimed in applicant's copending application, Serial No. 183,352, now U. S. Patent No. 2,766,432, granted October 9, 1956, filed concurrently herewith, and assigned to the same assignee as the present application, and a modified form is disclosed and claimed in he Daniel A. Lanciani application, Serial No. 183,371, now U. S. Patent No. 2,676,306, granted April 20, 1954, filed concurrently herewith, and also assigned to the same assignee as the present application. A transition utilizing multiple feed points but possessing a directional coupling characteristic between a circular and rectangular wave guide is disclosed and claimed in the Charles E. Arnold application, Serial No. 183,358, now U. S. Patent No. 2,643,298, granted June 23, 1953, filed concurrently herewith, and assigned to the same assignee as the present application.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A wave guide transition comprising a first wave guide portion providing a circular wave guide and a second wave guide portion providing a plurality of rectangular wave guide sections each opening endwise at its ends into said circular wave guide at spaced points around the circumference thereof and with the longer transverse cross-sectional dimension of said each section extending longitudinally of said circular wave guide, said second wave guide portion providing an additional rectangular wave guide section for each pair of said first-mentioned sections with each said additional section joined at its ends to individual ones of the wave guide sections of said each pair thereof and at a point on said individual wave guide section spaced equi-distant electrically from its ends, and a further rectangular wave guide portion joined in electrically balanced relation to said second wave guide portion and providing a rectangular wave guide through which energy is supplied to or received from said transition.

2. A wave guide transition comprising a first wave guide portion providing a circular wave guide and a second rectangular wave guide portion providing a plurality of wave guide sections each opening endwise at its ends into said circular wave guide at points equally spaced around the circumference thereof and with the longer transverse cross-sectional dimension of said each section extending longitudinally of said circular wave guide, said second wave guide portion providing an additional rectangular wave guide section for each pair of said first-mentioned sections with each said additional section joined at its ends to individual ones of the wave guide sections of said each pair thereof and at a point on said individual wave guide section spaced equi-distant electrically from its ends, and a further rectangular wave guide portion joined in electrically balanced relation to said second wave guide portion and providing a rectangular wave guide through which energy is supplied to or received from said transiion.

3. A wave guide transition comprising a first wave guide portion providing a circular wave guide and a second wave guide portion providing a rectangular wave guide section opening endwise at each of its ends into said circular wave guide at spaced points around the circumference thereof and with the longer transverse cross-sectional dimension of said section extending longitudinally of said circular wave guide, said second wave guide portion providing an additional rectangular wave guide section joined to said first-mentioned section at a point thereon spaced equi-distant electrically from its ends, and means coupled to said first-mentioned wave guide section in symmetrical proximity to the junction of said sections for absorbing wave-signal energy having any mode of propagation other than the $TE_{10}$ mode.

4. A wave guide transition comprising a first wave guide portion providing a circular wave guide and a second wave guide portion providing a rectangular wave guide section opening endwise at each of its ends into said circular wave guide at spaced points around the circumference thereof and with the longer transverse cross-sectional dimension of said section extending longitudinally of said circular wave guide, said second wave guide portion providing an additional rectangular wave guide section joined to said first-mentioned section at a point thereof spaced equi-distant electrically from its ends, and a closed cylindrical conductive member terminating said circular wave guide at one end thereof and effectively including a stepped bore of dimensions selected to reduce the magnitude of wave-signal propagation by modes differing from that desired for said circular wave guide.

5. A wave guide transition comprising a first wave guide portion providing a circular wave guide and a second wave guide portion providing a rectangular wave guide section opening endwise at each of its ends into said circular wave guide at spaced points around the circumference thereof and with the longer transverse cross-sectional dimension of said section extending longitudinally of said circular wave guide, said second wave guide portion providing an additional rectangular wave guide section joined to said first-mentioned section at a point thereon spaced equi-distant electrical from its ends, and a closed cylindrical conductive member terminating said circular wave guide at one end thereof and effectively including a stepped bore having the diameters and lengths of each step thereof selected to terminate said circular wave guide at distances differing for individual modes of propagation in said circular wave guide.

References Cited in the file of this patent
UNITED STATES PATENTS

| 2,471,021 | Bradley | May 24, 1949 |
| 2,526,383 | Meier | Oct. 17, 1950 |
| 2,540,148 | Tawney | Feb. 6, 1951 |
| 2,593,095 | Brehm | Apr. 15, 1952 |

OTHER REFERENCES

"Microwave Transmission Circuits" of the Radiation Laboratory Series edited by Ragan, vol. 9, page 368 pertinent. Copy in Div. 69.